United States Patent
Lin

(10) Patent No.: US 6,753,073 B2
(45) Date of Patent: Jun. 22, 2004

(54) DECOMPOSABLE PRODUCTS AND THEIR FABRICATION METHOD

(76) Inventor: Jung-Hsiang Lin, No. 17-3, La. 102, Ren Ai Rd., Changhua City (TW)

( * ) Notice: Subject to any disclaimer, the term of this patent is extended or adjusted under 35 U.S.C. 154(b) by 125 days.

(21) Appl. No.: 10/140,069

(22) Filed: May 8, 2002

(65) Prior Publication Data

US 2003/0160354 A1 Aug. 28, 2003

(30) Foreign Application Priority Data

Feb. 25, 2002 (TW) ........................................ 91103239 A

(51) Int. Cl.⁷ ............................ B32B 9/02; B29B 11/12; B29B 11/14
(52) U.S. Cl. ........................ 428/220; 428/532; 264/492; 264/494; 264/115
(58) Field of Search ................................. 428/220, 532; 264/492, 494, 115, 405, 493, 129, 108, 118, 122, 123, 125, 126

(56) References Cited

U.S. PATENT DOCUMENTS

| | | | | |
|---|---|---|---|---|
| 5,688,448 A | * | 11/1997 | Shutov et al. | 264/54 |
| 6,074,587 A | * | 6/2000 | Liu et al. | 264/112 |
| 6,461,549 B1 | * | 10/2002 | Meeuwsen | 264/40.4 |

* cited by examiner

Primary Examiner—Stephen J. Lechert, Jr.
(74) Attorney, Agent, or Firm—Browdy and Neimark, P.L.L.C.

(57) ABSTRACT

A decomposable product fabrication method includes the steps of a) preparing a plant powder obtained by crushing plant fibers and a viscous fluid additive containing a bonding agent, (b) mixing the prepared materials into a viscous mixture, c) drying the viscous mixture by baking, d) using a compression molding machine to mold the viscous mixture into a green ware and discharging steamy air out of the mold during compression molding, e) covering the green ware with a layer of waterproof coating, and f) baking the semi-finished product thus obtained from step e) to a dry status, so as to obtain a finished product after cooling.

19 Claims, No Drawings

DECOMPOSABLE PRODUCTS AND THEIR FABRICATION METHOD

BACKGROUND OF THE INVENTION

1. Field of the Invention

The present invention relates to decomposable products and their fabrication method and, more specifically, to a method of fabricating products that are decomposable to microbes.

2. Description of the Related Art

The so-called "wash-free" kitchen utensils are commonly molded from polystyrene polymers or made of hard paper material or wooden slats. Disposable kitchen utensils molded from polystyrene polymers are not decomposable to microbes. Using paper or wooden material to make disposable kitchen utensils need to fell a big amount of trees.

In recent years, manufacturers have created a variety of substitutes for making disposable kitchen utensil causing damage to the environment. These substitutes are commonly obtained from plant fibers (shells of wheat or rice), and molded into the desired finished products (bowls, dishes, pots, etc.) by a compression-molding machine. A disposable product made according to this method is decomposable to microbes. However, this method still has drawbacks including low structural strength and poor waterproof effect of finished products, complicated procedure, high manufacturing cost, etc.

Japanese patent publication No. 2000-355008 (P2000-355008A) discloses a method of fabricating decomposable products, in which plant material powder, mainly obtained from rice shells, is mixed with a decomposable substance containing a bonding agent into a mixture, and then the mixture is molded into a green ware at a predetermined pressure and temperature, and then woven fabric or non-woven fabric material is arranged on the green ware so as to obtain a semi-finished product, and then the semi-finished product is molded into the desired finished product at a predetermined pressure and temperature. Alternatively, prepared materials are mixed into a paste-like mixture and then applied to woven fabric or non-woven fabric materials, and then the mixture-coated woven fabric or non-woven fabric materials are dried into slats, and then prepared paste-like mixture is applied to the slats again, and at final the slated materials are molded into the finished products at a predetermined pressure and temperature. The use of woven fabric or non-woven fabric materials is to reinforce the strength of plant powder material. This method is complicated, resulting in high manufacturing cost of the finished products.

Decomposable products made according to the known decomposable product fabrication methods are still not acceptable to the market in practical use (strength, waterproof property, thermal stability, etc.), environmental protection (highly decomposable to microbes), and manufacturing cost. In order to reinforce the structural strength of the finished product, resin content may be relatively increased, for example, China Patent No. 97107979 teaches the use of 5~20% thermal melting glue; China Patent No. 98121944 teaches the use of 10~35% urea-formaldehyde resin. However, because resin is not decomposable to microbes, the finished product does not meet the requirement for environment protection. Adding water soluble resin or starch to plant powder material can make a product decomposable to microbes, however a product made according to this method has poor waterproof, oil resistant, acid-proof, and alcohol resistant properties and low thermal stability power.

SUMMARY OF THE INVENTION

The present invention has been accomplished under the circumstances in view. It is one object of the present invention to provide a decomposable product fabrication method, which is simple and economic to perform. It is another object of the present invention to provide a decomposable product fabrication method, which does not cause any environmental problem. It is still another object of the present invention to provide a decomposable product, which provides satisfactory waterproof, oil resistant, acid-proof, and alcohol resistant properties as well as high thermal stability power. The decomposable product fabrication method includes the steps of a) preparing a plant powder obtained by crushing plant fibers and a viscous fluid additive containing a bonding agent, (b) mixing the prepared materials into a viscous mixture, c) drying said viscous mixture by baking, so as to obtain a prepared raw material having a moisture content below a predetermined value, d) using a compression-molding machine to mold said prepared raw material into a green ware under a predetermined molding temperature and molding pressure, and discharging steamy air out of the mold during compression molding, e) covering said green ware with a layer of waterproof coating, so as to obtain a semi-finished product, and f) baking said semi-finished product to a dry status, so as to obtain a finished product, and then cooling the finished product thus obtained.

DETAILED DESCRIPTION OF THE PREFERRED EMBODIMENT

A decomposable product fabrication method in accordance with the present invention includes the steps of:

Step 1: preparing a plant powder and a viscous fluid additive containing a bonding agent, wherein the plant powder is obtained by crushing plant fibers obtained from one or a mixture of at least two of the materials including rice shells, wheat shells, bamboo canes, peanut shells, sugar cane residues, rice straws, and pulps, into power material of diameter within 50~200 meshes; the viscous fluid additive is comprised of non-toxic synthetic resin, which can be one or a mixture of at least two of the materials including epoxy resin, siliconized compound (for example, TEOS), synthetic rubber, petroleum resin, EVA (ethylene-vinylacetate), PVA (polyvinyl alcohol) and PVAC (polyvinyl acetate), solvent, which can be one or a mixture of at least two of the materials including benzene, dimetheylbenzene and ethanol, and hardener; the viscous fluid additive is prepared by, for example, adding solid epoxy resin to the solvent and heating the mixture to about 100° C., and then mixing the mixture into fully solved liquid status, and then adding the hardener to the liquid mixture;

Step 2: mixing 70~98 wt % of the prepared plant powder with 2~30 wt % of the prepared viscous fluid additive in a high speed mixer for about 30~100 seconds into a viscous mixture;

Step 3: drying the viscous mixture thus obtained into a prepared raw material having a moisture content below 10%, solid resin content 0.9~13.5%, and decomposable substance (plant material) 86.5~99.1%;

Step 4: using a compression molding machine to mold the prepared raw material into a green ware subject to the shape, thickness, or physical characteristics of the desired finished product, under the terms of mold temperature 50~180° C., mold pressure 25~85 kg/cm$^2$, and molding time 5~50 seconds, where the molding process includes an exhausting procedure to discharge air (steamy air) out of the molding material so that the shaped green ware has a better quality and strength; the molding process provided in the present invention is to employ a relatively lower pressure to the mold to mold the prepared viscous mixture into shape, and then to open the mold properly for enabling steam and air to be discharged out of the mold, and then to employ a relatively higher pressure to the mold (a secondary exhausting procedure may be needed in molding certain finished products) to mold the prepared viscous mixture into the desired green ware, for example, bowl, dish, spoon, etc. of thickness within 0.5~10 mm;

Step 5: baking the green ware thus obtained at 100° C. to remove its water and air content (this step may be omitted if the precedent steps are well performed);

Step 6: covering the whole outside wall or a part of the outside wall of the green ware (for example, the top surface of the green ware) thus obtained with a layer of waterproof coating of thickness within 5~30 μm by means of spray-painting or dipping, where the waterproof coating can be obtained from a waterproof oil paint or waterproof water paint; the waterproof oil paint can be obtained from epoxy resin added with a hardener to provide a bridging effect and to reinforce the key bonding strength of the material, or epoxy resin added with $CaCo_3$ to improve the surface brightness of the paint; the waterproof water pain can be obtained from emulsified acrylic resin for the advantage of being highly decomposable;

Step 7: baking the semi-finished product thus obtained from Step 6 at 80~150° C. for about 5~20 minutes to dry the waterproof coating, so as to obtain a finished product; and Step 8: cooling the finished product in the open air.

In case the finished product is a kitchen utensil, a further sterilizing is necessary to sterilize the finished product and then to wrap the sterilized finished product. If the finished product is a regular home product (flower pot or ash-tray) not to be used to hold food, the sterilizing step can be eliminated. The sterilizing operation can be simultaneously achieved by high-temperature baking during the aforesaid step 7. Alternatively, infrared or ultraviolet radiation may be employed to sterilize the finished product.

The aforesaid decomposable product fabrication method can be used to fabricate green kitchen utensils such as bowls, dishes, pots, spoons, etc., garden ware such as flower pots and gardening pots, ash-trays, plate materials, tee pegs, etc. The invention has industrial value because the fabrication procedure is not complicated and the main material (plant fiber materials are waste plant shells that have little agricultural value) is easy and inexpensive to obtain. Further, because the materials can easily be obtained without felling trees and the finished products are decomposable to microbes, the invention does not cause any environmental problems.

As indicated above, a decomposable product according to the present invention is obtained from a material prepared from the mixture of a plant powder and a liquid additive. The prepared material is dried, and then molded into the desired finished product by a compression-molding machine. During compression molding, an exhaust procedure is taken to discharge steamy air from the molded material (residual water and air in the material will affect the bonding strength of the molecules of the material, resulting in weak structural strength). A decomposable product made according to the present invention has a compact structure, which provides satisfactory waterproof, oil resistant, acid-proof, and alcohol resistant properties as well as high thermal stability power.

A decomposable product made according to the invention, when examined under an extraction test, shows the data of: water 214 ppm, 4% $CH_3COOH$ 3.5 ppm, 20% Alcohol 6.0 ppm, n-Heptane zero in dried residues with 30 minutes of testing time and 60° C. of testing temperature; Xylene 0.71 ppm in solvent residues with 60 minutes of testing time and 25° C. of testing temperature.

What the invention claimed is:

1. A decomposable product fabrication method comprising the steps of:
   a) preparing a plant powder obtained by crushing plant fibers and a viscous fluid additive containing a bonding agent;
   b) mixing said plant powder with said viscous fluid additive into a viscous mixture;
   c) drying said viscous mixture by baking, so as to obtain a prepared raw material having a moisture content below a predetermined value;
   d) using a compression-moulding machine to mold said prepared raw material into a green ware under a predetermined molding temperature and molding pressure, and discharging steamy air out of the mold during compression molding;
   e) covering said green ware with a layer of waterproof coating, so as to obtain a semi-finished product; and
   f) baking said semi-finished product to a fry status, so as to obtain a finished product, and then cooling the finished product thus obtained.

2. The decomposable product fabrication method as claimed in claim 1, wherein said plant powder is obtained by crushing the plant fibers obtained from at least one material selected from the group consisting of rice shells, wheat shells, bamboo canes, peanut shells, sugar cane residues, rice straws, and pulps.

3. The decomposable product fabrication method as claimed in claim 1, wherein said powder material has a diameter within 50 to 200 meshes.

4. The decomposable product fabrication method as claimed in claim 1, wherein said viscous fluid additive is comprised of a synthetic resin, a solvent, and a hardener.

5. The decomposable product fabrication method as claimed in claim 4, wherein said synthetic resin is comprised of at least one material selected from the group consisting of epoxy resin, siliconized compound, synthetic rubber, petroleum resin, EVA (ethylene-vinylacetate), PVA (polyvinyl alcohol) and PVAC (polyvinyl acetate).

6. The decomposable product fabrication method as claimed in claim 4, wherein said solvent is comprised of at least one material selected from the group consisting of benzene, dimethylbenzene and ethanol.

7. The decomposable product fabrication method as claimed in claim 1, wherein said viscous mixture is comprised of 70 to 98 wt % plant powder and 2 to 30 wt % viscous fluid additive.

8. The decomposable product fabrication method as claimed in claim 1, wherein said plant powder and said viscous fluid additive are mixed in a high-speed mixer for about 30 to 100 seconds during step a).

9. The decomposable product fabrication method as claimed in claim 1, wherein said viscous mixture is dried into the prepared raw material having a moisture content below 10%, solid resin content 0.9 to 13.5%, and decomposable substance 86.5 to 99.1% during step c).

10. The decomposable product fabrication method as claimed in claim 1, wherein said prepared raw material is molded into a green ware at 50 to 180° C. and 25 to 85 kg/cm² for 5 to 50 seconds during step d).

11. The decomposable product fabrication method as claimed in claim 1, wherein the green ware thus obtained in step d) has a thickness within 0.5 to 10 mm.

12. The decomposable product fabrication method as claimed in claim 1, further comprising a sub-step to dry said green ware by baking after step d) and before step e).

13. The decomposable product fabrication method as claimed in claim 1, wherein step e) of covering said green ware with the layer of waterproof coating is achieved by means of a spray-painting procedure.

14. The decomposable product fabrication method as claimed in claim 1, wherein step e) of covering said green ware with the layer of waterproof coating is achieved by means of a dipping procedure.

15. The decomposable product fabrication method as claimed in claim 1, wherein the thickness of the layer of waterproof coating during step e) is about 5 to 30 µm.

16. The decomposable product fabrication method as claimed in claim 1, wherein step e) of covering said green ware with the layer of waterproof coating is to cover a layer of waterproof coating on a part of the surface of said green ware.

17. The decomposable product fabrication method as claimed in claim 1, wherein said semi-finished product is dried during step f) at 80 to 150° C. for about 5~20 minutes.

18. The decomposable product fabrication method as claimed in claim 1 further comprising a sub-step to sterilize the finished product by baking at a high temperature after step f).

19. The decomposable product fabrication method as claimed in claim 1 further comprising a sub-step to sterilize the finished product by infrared rays or ultraviolet rays after step f).

* * * * *